(12) United States Patent
Devine

(10) Patent No.: US 6,422,132 B1
(45) Date of Patent: Jul. 23, 2002

(54) MULTI-USE BREW BOWL

(75) Inventor: John Patrick Devine, Toronto (CA)

(73) Assignee: Mother Parker's Tea & Coffee Inc., Mississauga (CA)

( * ) Notice: Subject to any disclaimer, the term of this patent is extended or adjusted under 35 U.S.C. 154(b) by 0 days.

(21) Appl. No.: 09/688,261

(22) Filed: Oct. 13, 2000

(51) Int. Cl.⁷ .................... A47J 31/00; B01D 29/085
(52) U.S. Cl. ................... 99/284; 99/299; 99/306; 99/323
(58) Field of Search .................. 99/299, 305, 306, 99/284, 323, 279

(56) References Cited

U.S. PATENT DOCUMENTS

| | | |
|---|---|---|
| 1,108,288 A | 8/1914 | Watson |
| 2,543,581 A | 2/1951 | Koski ........................... 99/305 |
| 2,856,842 A | 10/1958 | Schwaneke et al. .......... 99/281 |
| 3,187,663 A * | 6/1965 | McLean, Jr. et al. ......... 99/305 |
| 3,320,073 A | 5/1967 | Bixby, Jr. et al. |
| 3,333,964 A | 8/1967 | Bender |
| 3,450,024 A | 6/1969 | Martin ........................ 99/295 |
| 4,064,795 A | 12/1977 | Ackerman .................... 99/304 |
| 4,381,696 A | 5/1983 | Koral .......................... 99/304 |
| 4,642,190 A * | 2/1987 | Zimmerman ............... 99/306 X |
| 4,739,697 A | 4/1988 | Roberts ....................... 99/295 |
| 4,986,172 A | 1/1991 | Hunnicutt, Jr. .............. 99/306 |
| 5,775,204 A | 7/1998 | Link et al. .................... 99/299 |
| 5,813,317 A | 9/1998 | Chang ......................... 99/285 |
| 5,826,493 A | 10/1998 | Lin .............................. 99/306 |

\* cited by examiner

Primary Examiner—Reginald L. Alexander
(74) Attorney, Agent, or Firm—Ohlandt, Greeley, Ruggiero & Perle, LLP

(57) ABSTRACT

A brew bowl adaptor for use in association with a beverage brew bowl of the type defining a bowl side wall and bottom wall, and a fluid opening in the bottom wall through which beverage may pass after brewing, and having a body to fit in the fluid opening substantially blocking the same, retaining device retaining the body in the opening, and a beverage drip passageway formed through the plug body, of reduced cross sectional area in regard to fluid opening in the brew bowl, the body being insertable into and removable from the fluid opening in the brew bowl.

7 Claims, 3 Drawing Sheets

MULTI-USE BREW BOWL

FIELD OF THE INVENTION

The invention relates to a bowl for brewing hot beverages such as coffee and tea, typically in institutions or food outlets, where larger quantities of beverages are to be brewed. The brew bowl is adaptable to the brewing of both coffee and tea.

BACKGROUND OF THE INVENTION

In fast food outlets, office, institutions, and the like. it is common for coffee to be made using a water heater and a hot water container and a brew bowl containing coffee grounds. Usually a paper filter is used inside the bowl or cup to filter the coffee grounds. As the hot water flows down from the hot water container into the bowl it will brew coffee from the coffee grounds. The coffee gradually drips down through the filter and flows out of the bowl drip opening too soon. As a result, it out of a drip opening at the bottom of the bowl.

Most of such coffee brew bowls incorporate some form of wire support at the lower end for holding the coffee filter above the bottom of the bowl. A drip outlet is located at the bottom of the bowl to allow beverage to drip down. Usually the beverage is collected in a glass jug, or other container. The beverage is dispensed from the jug as required.

This process ensures that the coffee grounds are immersed in hot water for a reasonable length of time so as to brew good tasting coffee.

However, in such institutions, it is also common to make tea in the same way, in the same brew bowl, using the same equipment. Usually tea bags are simply placed, several in one brew bowl. Hot water is then allowed to flow over the bags. In these cases, however, when brewing tea, it is the usual practice that the paper filter is not used (although this is not excluded). The water tends to flow too quickly through the tea bags and does not brew tea of an adequate strength.

BRIEF SUMMARY OF THE INVENTION

With a view to providing a brew bowl capable of brewing coffee or tea, of an adequate flavour, the invention provides a brew bowl adaptor for use in association with a beverage brew bowl of the type defining a bowl side wall and bottom wall, and a fluid drip opening in the bottom wall through which beverage may pass after brewing, the opening having a predetermined first diameter, and having a plug body having a predetermined cross sectional dimension and shape, corresponding to and adapted to fit in said predetermined shape of said drip opening, substantially blocking the same, means on said plug body retaining in same said bowl, and retaining said plug body in said passageway, and, a beverage drip passageway formed through said plug body, of reduced cross sectional area in regard to said drip opening in said brew bowl, said plug body being insertable into and removable from said drip opening in said brew bowl, whereby to provide a faster fluid flow through said drip opening when said plug body is removed, and a reduced fluid flow through said drip passageway when said plug body is inserted into said drip opening.

The invention provides a brew bowl adaptor wherein said plug body defines a generally cylindrical exterior surface, and a flange abutment portion on said exterior surface of greater dimension than said cylindrical body, whereby to retain said plug body in said drip opening in said brew bowl.

The invention further provides a brew bowl adaptor wherein said flange is an annular flange having a diameter greater than the diameter of said plug body.

The invention further provides a brew bowl adaptor wherein said reduced passageway is a cylindrical bore extending through said plug body and said annular flange.

A brew bowl of the type used for brewing beverages such as coffee and tea, said brew bowl having a generally circular bottom wall and an upstanding side wall extending upwardly from said bottom wall defining an open-topped bowl, a fluid flow drip opening means in the bottom of said bottom wall, through which brewed beverage may pass, support means in said brew bowl for supporting a beverage filter therein, handle means on the exterior of said brew bowl whereby the same may be handled when hot, a flow adaptor for said brew body, said flow adaptor having an exterior shape adapted to make a snug retention fit in said fluid drip opening, and said adaptor defining a reduced area drip passageway, whereby when said adaptor is not in use, fluid may pass at a first flow rate from said brew bowl through said drip opening, and when said adaptor is in position in said drip opening, fluid will flow from said bowl at a second rate of a reduced speed in relation to said first rate.

IN THE DRAWINGS

DESCRIPTION OF A SPECIFIC EMBODIMENT

As explained above, the invention relates to the adaptation of an institutional type beverage brewing equipment for brewing either coffee on the one hand or tea on the other using the same brewing equipment. An adaptor is used in the brew bowl to adapt to use for brewing tea.

As already explained above, the invention is applicable to brew bowls of the type which are used in large capacity beverage brew equipment, such as is used in institutions or fast food restaurants. These installations may be standalone installations, similar to but larger than domestic coffee brewing devices of the drip type. In other cases, this brewing equipment may be in the form of a multi-station system adapted for brewing beverages at a series of stations, either simultaneously or one after the other.

Figure 1:
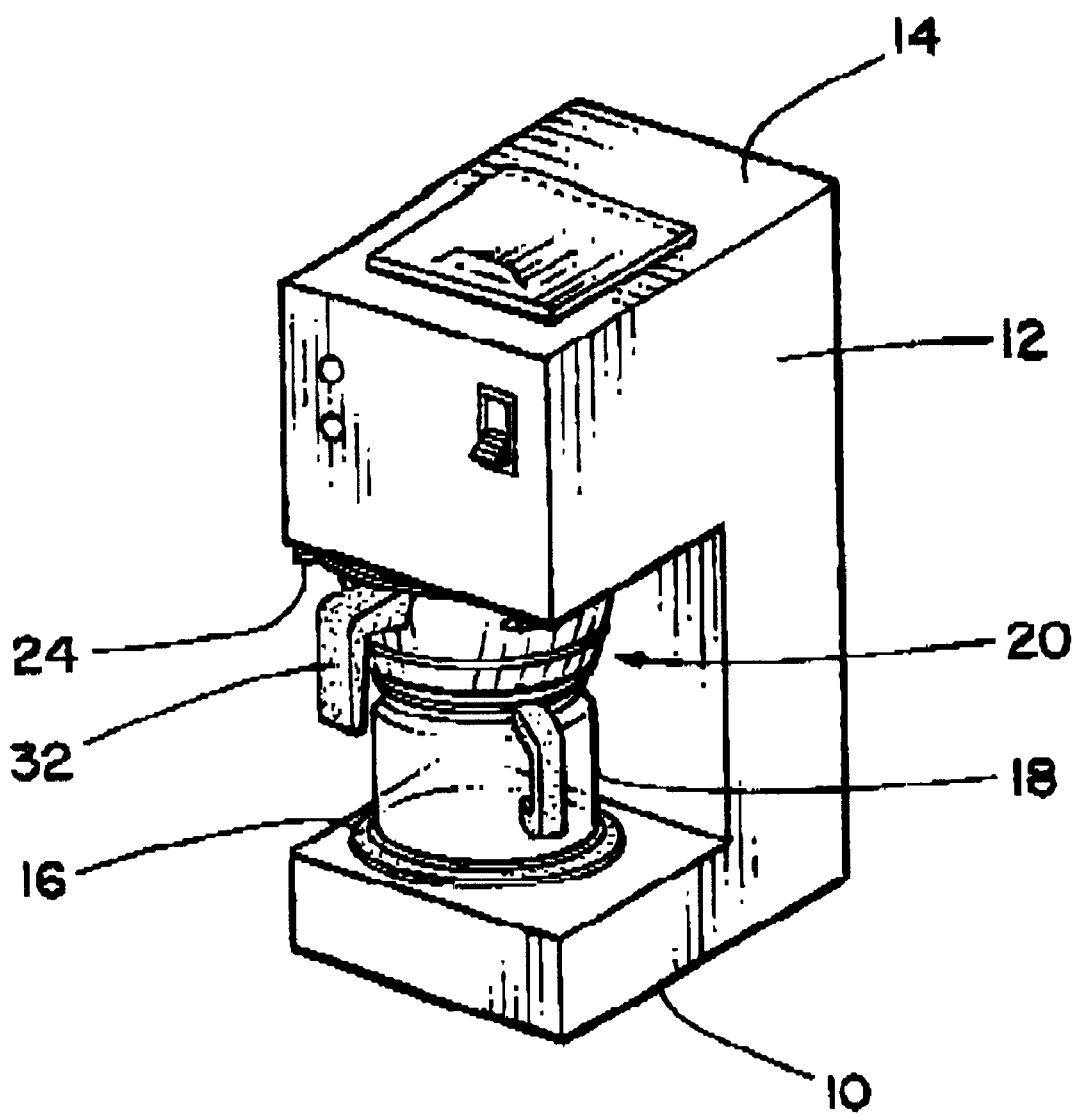
FIG. 1 is a perspective of a typical beverage brewing facility as used in institutions or food outlets.

Purely by way of example, a typical stand-alone brew system is shown in FIG. 1. It will be seen to comprise a base (10), and upstanding housing portion (12) and a top housing container (14). Usually the top container (14) will incorporate a water heater (not shown). Typically, a hot plate (16) will be supported on the bottom portion and a beverage dispensing container (18) will stand on the hot plate, containing beverage ready for dispensing as it is required by customers.

The entire device may be connected by fixed plumbing to a source of water for supplying fresh water to be heated. Alternatively, the top housing (14) may be provided with a filling opening by means of which fresh water may be filled into the brewing device for each batch of beverage to be brewed.

In these systems, a brew bowl (20) is provided. Typically, the brew bowl (20) has a rim (22) which fits into a pair of parallel slide flanges (24) located on the underside of the top container (14). In this way, the brew bowl may be slid in and out, in the manner described below.

It will, of course, be appreciated that this description is merely by way of example and without limitation. Many varieties and designs of such beverage brewing equipment are available. It is not intended to restrict or limit the scope of the invention to any one such type.

Figure 2:
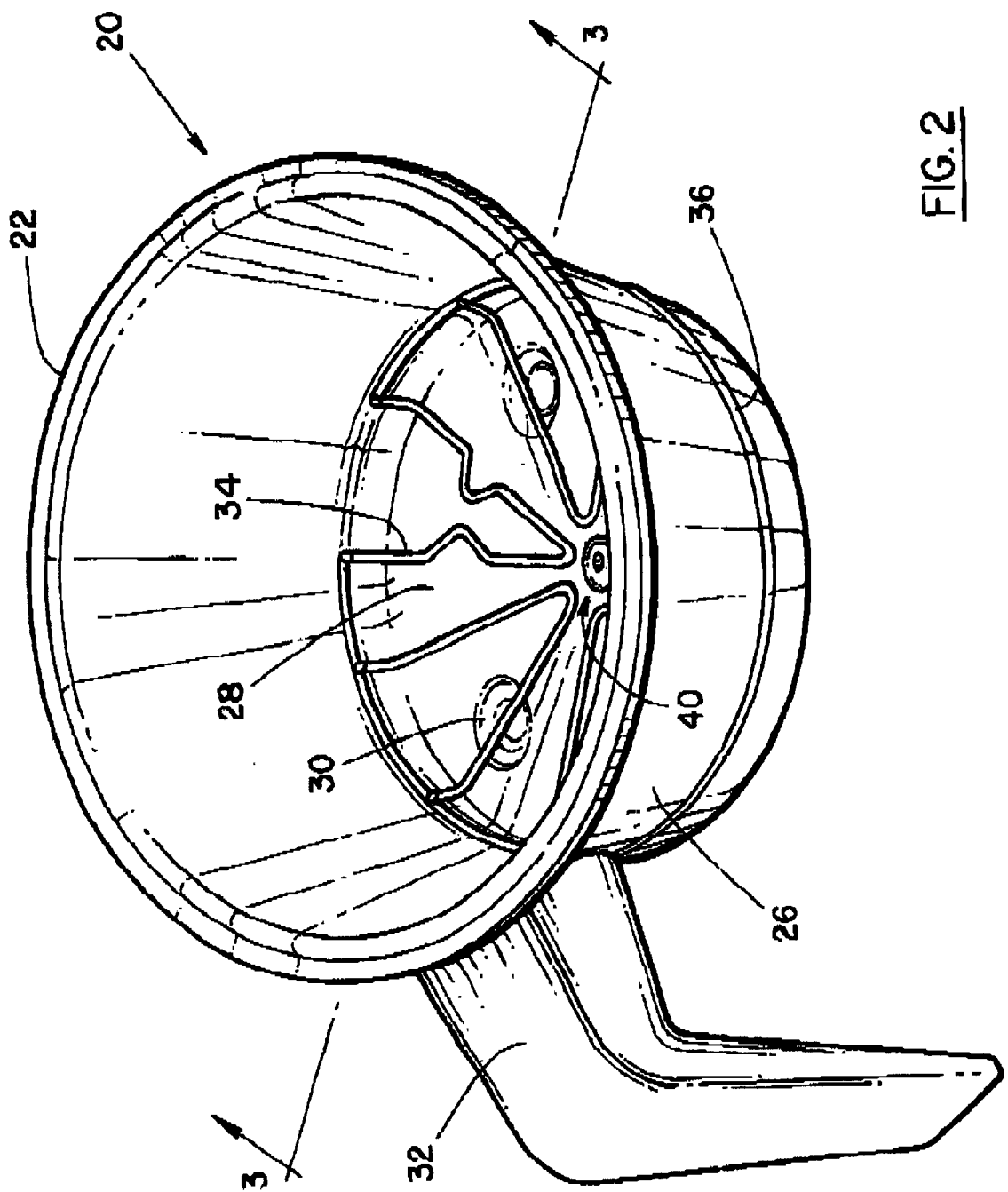
FIG. 2 is perspective illustration of a typical beverage brew bowl, incorporating a brewing adaptor illustrating the invention.
Figure 3:
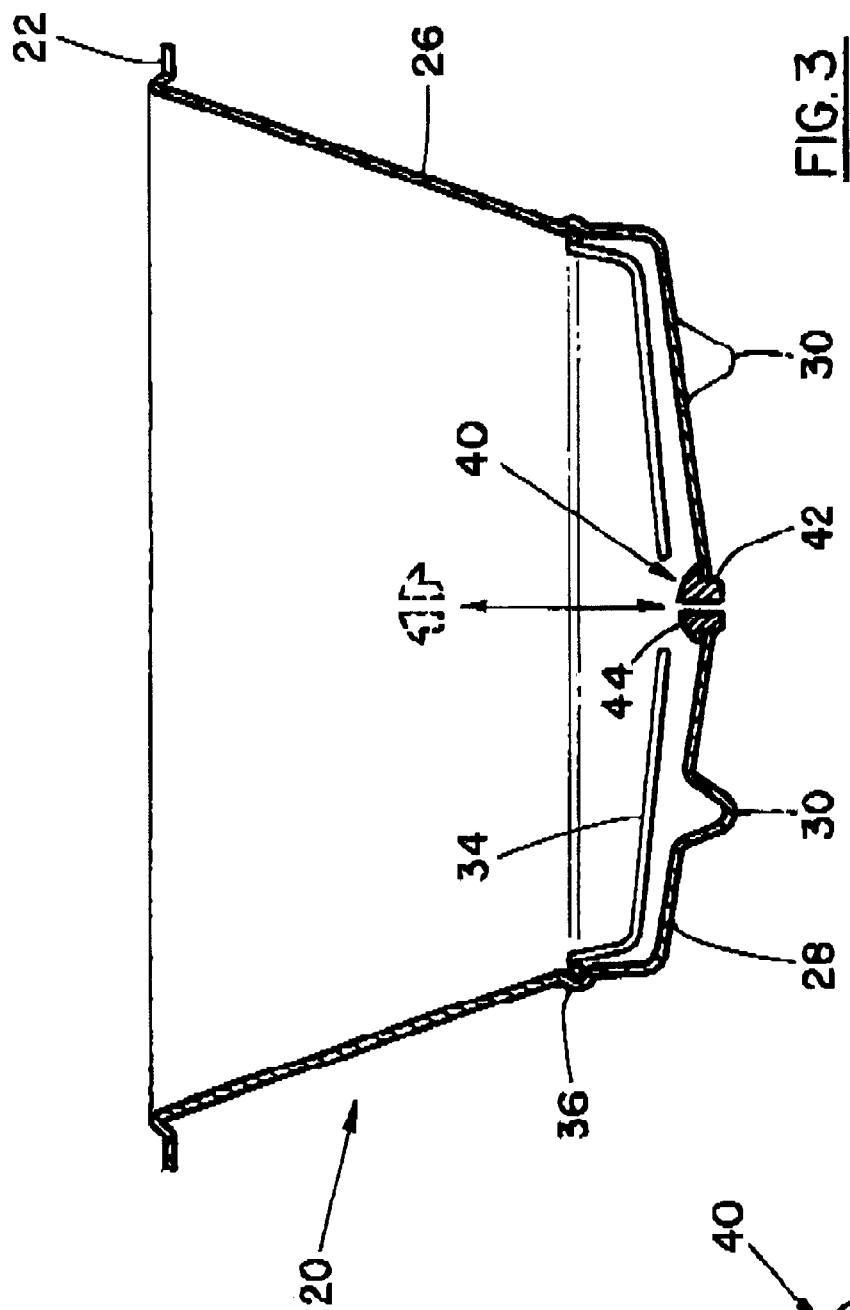
FIG. 3 is a section along the line of (3—3) of FIG. 2, illustrating the brew bowl adaptor in two positions.
Figure 4:
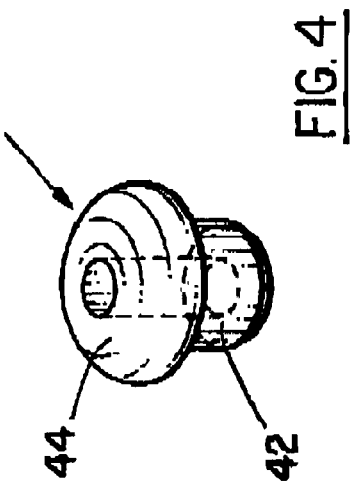
FIG. 4 is an enlarged perspective illustration showing the brew bowl adaptor in isolation.

FIGS. 2 and 3 illustrate the brew bowl (20) such as is typically used in institutions, food outlets and the like. The brew bowl (20) has a generally frusto-conical bowl side wall (26) and bottom wall (28) closing the bottom of the side wall. The bottom wall (28) has upper and under surfaces and is typically shaped with a central depression, somewhat like a saucer. On the underside of the bottom wall (28) there are preferably provided a plurality of abutments (30), which form feet on which the bowl can stand on a counter top while it is being filled with either coffee or tea bags.

Typically, the brew bowl (20) will have an upper rim (22). As is well known, such a rim can be fitted into suitable retaining flanges (24) on the brewing equipment (14) shown in FIG. 1, all of which is well known in the art. The bowl is preferably provided with a handle (32) by means of which the bowl can be placed in position and removed.

As is general in such equipment, a wire retaining basket (34) is located in the lower portion of the bowl (20). An annular retaining groove (36) may be provided in the lower region of the side wall (26) for retaining the basket (34) in position, as shown. Bowl bottom wall (28) has a cylindrical shaped coffee drip opening (38) located centrally in wall (28).

Typically, when brewing coffee, a paper coffee filter (not shown) is placed in the brew bowl, lying on top of the basket (34). The filter is then filled with a suitable quantity of coffee grounds. The bowl (20) is then placed in position in the brewing equipment (14), and high temperature water is then flowed down from the top container (14) into the bowl and through the coffee grounds. Brewed coffee will flow outwardly from the bowl, through coffee drip opening (38) provided in the bottom wall (28). Opening (38) defines a cylindrical flow opening of a first predetermined diameter, extending from the upper surface to the under surface of wall (28). Typically, when brewing coffee, the coffee grounds themselves will represent a significant restriction to the flow of water from the bowl through the opening (38). This causes a dwell time, for holding the water in the grounds, which will usually be sufficient to allow the brewing of coffee of adequate strength.

In order to adapt the brew bowl to multiple uses of brewing either coffee or tea, a brew bowl tea adaptor, indicated generally as (40) is provided. The tea adaptor (40) comprises a plug-like member, having a generally smooth cylindrical plug body (42) and an annular flange head (44) located at the upper end of the cylindrical body (42), the annular flange being of a greater diameter than the body. The flange head (44) defines a general mushroom or dome shaped top profile.

A tea drip passage (46) is formed through the annular flange head (44) and through the smooth cylindrical plug body (42). Cylindrical body (42) is smooth and is sized so as to make a snug sliding retention fit in the cylindrical coffee drip opening (38) in the bottom wall (28) of the brew bowl (20). The flange head (44) lies on the upper surface of brew bowl bottom wall (28) and retains the plug body and prevents it from passing through the coffee drip opening (38) in the bottom wall (28) of brew bowl (20). In order to restrict the flow of brewed tea from the brew bowl (20) it will be observed that the diameter and size of the tea drip passage (46) in the adaptor (40) defines a second diameter which is significantly reduced in relation to the predetermined first diameter of the coffee drip opening (38) in the bottom wall (28) of the brew bowl (20).

When brewing tea, the wire basket is usually removed (if necessary) and the adaptor (40) is placed in position with the smooth cylindrical plug body 42 sliding snugly into the drip opening (38) in the bottom wall (28) of the brew bowl (20). The flange head (44) lies on the interior upper surface of the bottom wall (28) of the bowl to retain adaptor (40) in position. The wire basket, if it has been removed, is then usually replaced.

When brewing tea, tea bags of conventional type (not shown) are simply placed usually on the wire basket (34). In this case, the paper filter conventionally used when brewing coffee is not required and, in most cases, is not used although its use is not excluded.

The brew bowl is then placed in position in the brewing equipment. High temperature water is then allowed to flow from the top container (14) into the bowl (20). As the water flows into the bowl, the reduced diameter of the drip passage (46) in the adaptor (40) of the brew bowl (20), will restrict the speed of outflow of the brewed tea. This will cause the hot water to remain in the brew bowl (20) for a sufficient dwell time to ensure brewing tea of adequate strength. If desired, various adaptors may be provided, in which the drip passageway diameter varies from one adaptor to another. This enables the user to achieve the optimum brew cycle.

When a sufficient quantity of water has flowed through the bowl, brewing tea from the tea bags, the bowl can then simply be removed and the tea bags discarded. All that is then required to return the bowl to use for brewing coffee is simply to remove the adaptor (40), by sliding the smooth cylindrical body (42) out of drip opening (38) and storing it.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A brew bowl adaptor for use in association with a beverage brew bowl for brewing coffee or tea, the bowl being of the type defining a bowl side wall and bottom wall having an upper and an under side, and a coffee drip opening of cylindrical shape extending through the bottom wall from its upper surface to its under surface, through which coffee may pass after brewing, the opening having a predetermined first diameter, and comprising:

a plug body having a smooth cylindrical shape of predetermined cross sectional dimension and shape, corresponding to and adapted to make a sliding fit in said smooth cylindrical shape of said coffee drip opening in said brew bowl, substantially blocking the same;

a generally mushroom shaped flange on said plug body for lying on said upper surface of said brew bowl bottom wall thereby retaining said plug body in said coffee drip opening in said bowl, and preventing downward sliding movement of said plug body through said coffee drip opening; and a tea drip passageway formed through said flange and said plug body, said tea drip passageway being of reduced diameter and cross sectional area in regard to said coffee drip opening in said brew bowl, said plug body being slidably insertable into and removable from said coffee drip opening in said brew bowl, whereby to provide a greater fluid flow of coffee when said plug body is removed, and a reduced fluid flow of tea when said plug body is slid into said coffee drip opening.

2. A brew bowl adaptor as claimed in claim 1, wherein said flange is an annular flange having a diameter greater than the diameter of said cylindrical plug body.

3. A brew bowl adaptor as claimed in claim 2, wherein said drip passageway is a cylindrical bore extending through said plug body and said annular flange.

4. A multi-use brew bowl used for brewing coffee or tea, said brew bowl comprising:

a generally transverse bottom wall having an upper surface and an under surface, and an upstanding side wall extending upwardly from said bottom wall defining an open-topped bowl;

a coffee drip opening of smooth cylindrical shape extending from said upper surface to said under surface of said bottom wall, formed in said bottom wall, through which brewed coffee may pass;

a plurality of supports in said brew bowl for supporting a coffee filter therein;

a handle in the exterior of said brew bowl whereby the same may be handled; and a bowl adaptor for said brew bowl, said adaptor having a smooth cylindrical exterior shape making a snug sliding fit in said coffee drip opening in said bottom wall of said brew bowl; a reduced area tea drip passageway formed through said adaptor, whereby when said adaptor is not in use, coffee may pass at a first flow rate from said brew bowl through said drip opening in said bottom wall, and when said adaptor is slid into said coffee drip opening for brewing tea, tea will flow from said brew bowl through said tea drip opening in said adaptor at a second rate at a reduced speed in relation to said first rate.

5. A brew bowl as claimed in claim 4, wherein said adaptor defines a plug body having a generally smooth cylindrical exterior surface, and a generally mushroom shaped flange on said exterior surface of greater dimension than said cylindrical plug body, whereby restrain passage of said plug body through said coffee drip opening in said brew bowl.

6. A beverage brewing apparatus comprising:

a container for hot water;

support means for supporting a beverage brew bowl for receiving hot water from said hot water container, for brewing a beverage in said bowl, said beverage brew bowl having a bottom wall defining a fluid flow opening having a first predetermined cross sectional area permitting a first fluid flow rate there through;

a dispenser positioned beneath said brew bowl for receiving brewed beverage therefrom;

a removable flow adaptor for fluid flow opening of said brew bowl, said flow adaptor having an exterior smooth cylindrical shape making a snug sliding fit in said fluid drip opening in said brew bowl, said adaptor having a reduced area fluid drip passageway extending through said adaptor and a retainer on said adaptor to engage said bottom wall of said brew bowl and retain said plug body in said brew bowl drip opening; and whereby when said adaptor is not in position in said brew bowl drip opening, fluid may pass at a first flow rate from said brew bowl through said brew bowl drip opening, and when said adaptor is slid into said brew bowl drip opening, fluid will flow from said brew bowl through said adaptor opening at a second rate of a reduced speed in relation to said first rate.

7. A beverage brewing apparatus as claimed in claim 6, wherein said opening in said adaptor is a cylindrical bore.

\* \* \* \* \*